(12) United States Patent
Coughlin (10) Patent No.: US 7,744,034 B2
(45) Date of Patent: Jun. 29, 2010

(54) TRANSLATING FLAP DRIVE DOOR

(75) Inventor: Ray F. Coughlin, Mukilteo, WA (US)

(73) Assignee: The Boeing Company, Chicago, IL (US)

( * ) Notice: Subject to any disclaimer, the term of this patent is extended or adjusted under 35 U.S.C. 154(b) by 270 days.

(21) Appl. No.: 11/829,780

(22) Filed: Jul. 27, 2007

(65) Prior Publication Data

US 2009/0026317 A1 Jan. 29, 2009

(51) Int. Cl.
  *B64C 1/14* (2006.01)
(52) U.S. Cl. ............ 244/129.4; 244/130; 244/213
(58) Field of Classification Search ............ 244/129.4, 244/129.5, 211, 212, 213, 214, 215, 216, 244/217, 130, 131, 219, 137.1, 129.1, 102 R, 244/129.3
  See application file for complete search history.

(56) References Cited

U.S. PATENT DOCUMENTS

| | | | | |
|---|---|---|---|---|
| 3,356,317 A | * | 12/1967 | Bird | 244/46 |
| 4,131,252 A | | 12/1978 | Dean et al. | |
| 4,576,347 A | | 3/1986 | Opsahl | |
| 4,979,702 A | * | 12/1990 | Franklin | 244/129.4 |
| 6,015,117 A | * | 1/2000 | Broadbent | 244/214 |
| 6,189,833 B1 | * | 2/2001 | Ambrose et al. | 244/129.5 |
| 2006/0145013 A1 | * | 7/2006 | Gomez | 244/130 |

FOREIGN PATENT DOCUMENTS

| | | |
|---|---|---|
| DE | 723 748 C | 8/1942 |
| EP | 1 516 813 A1 | 3/2005 |
| EP | 1 787 905 A2 | 5/2007 |

OTHER PUBLICATIONS

Invitation to Pay Additional Fees and, Where Applicable, Protest Fee dated Sep. 30, 2008 for PCT Appl. No. PCT/US2008/067544.

* cited by examiner

*Primary Examiner*—Tien Dinh
*Assistant Examiner*—Richard R Green
(74) *Attorney, Agent, or Firm*—Klintworth & Rozenblat IP LLC (57) ABSTRACT

In one embodiment, an apparatus is provided for covering and uncovering a flap opening in an aircraft. The apparatus comprises a door member, a torque tube roller member, at least one roller member, and a biasing member. The door member may be adapted to cover and uncover a flap opening. The torque tube roller member may be attached with the door member, and may be adapted to be pushed by a torque tube member attached with a flap of an aircraft. The door member may be adapted to be driven from a closed position covering a flap opening into an open position uncovering a flap opening. The roller member may be attached with the door member and may be adapted to follow at least one track member. The biasing member may be attached with the door member for biasing the door member towards a closed position covering a flap opening.

14 Claims, 8 Drawing Sheets

TRANSLATING FLAP DRIVE DOOR

BACKGROUND

Aircraft often use torque tube members to move flaps from stowed to deployed positions. The torque tube members may penetrate the wing to body fairing. To accommodate flap motion, a large flap opening may be created in the wing to body fairing which must be closed off during cruise flight. Some existing aircraft utilize one or more kicker doors members that are pushed aside by the flap when it deploys. However, these kicker door members may not accommodate for variable camber during flight to allow for small angular displacements of the flap without opening the kicker door members. Further, these kicker door members may not work in the allowable geometries of some aircraft. Still other existing aircraft utilize elephant ear fairings which are large fairings attached to the flap. However, these may be undesirable because they may increase drag and noise.

An apparatus for covering and uncovering a flap opening in an aircraft, and method for its use, is needed to decrease one or more problems associated with one or more of the existing apparatus and/or methods.

SUMMARY

In one aspect of the disclosure, an apparatus is provided for covering and uncovering a flap opening in an aircraft. The apparatus comprises a door member, a torque tube roller member, at least one roller member, and a biasing member. The door member may be adapted to cover and uncover a flap opening in an aircraft. The torque tube roller member may be attached with the door member. The torque tube roller member may be adapted to be pushed by a torque tube member attached with a flap of an aircraft. In such manner, the door member may be adapted to be driven from a closed position covering a flap opening in an aircraft into an open position uncovering a flap opening in an aircraft. The roller member may be attached with the door member and may be adapted to follow at least one track member of an aircraft. The biasing member may be attached with the door member for biasing the door member towards a closed position covering a flap opening in an aircraft.

In another aspect of the disclosure, an apparatus is provided comprising a door member for covering and uncovering a flap opening in an aircraft. In a first mode the flap opening is covered by the door member and movement of a flap member of the aircraft does not cause the door member to open to uncover the flap opening. In a second mode movement of the flap member causes the door member to open to uncover the flap opening.

In a further aspect of the disclosure, a method is provided of covering and uncovering a flap opening in an aircraft. In one step, an apparatus is provided. The apparatus may comprise: a door member attached with a torque tube roller member; at least one roller member attached with the door member and a track member of the aircraft; and at least one biasing member attached with the door member and the aircraft. In another step, the flap opening in the aircraft may be covered with the door member in a closed position when a flap member of the aircraft is in a stowed position. In still another step, the door member may be biased, using the biasing member, towards remaining in the closed position. In yet another step, the flap member may be moved from the stowed position into a deployed position. In an additional step, the door member may be moved into an open position in which the flap opening is not completely covered by the door member. This may occur by pushing a torque tube member attached with the flap member against the torque tube roller member when the flap member is moved from the stowed position into the deployed position.

These and other features, aspects and advantages of the disclosure will become better understood with reference to the following drawings, description and claims.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
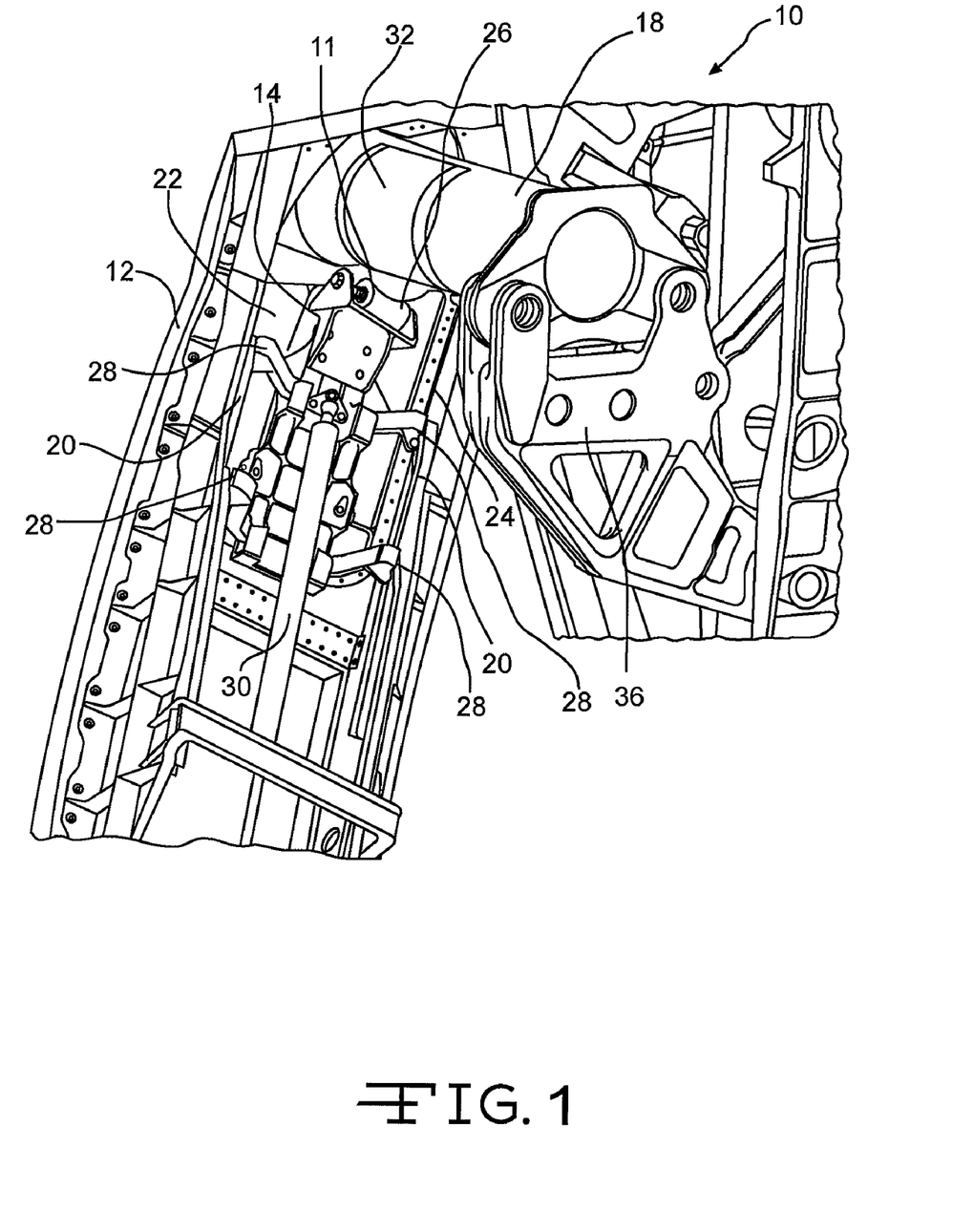
FIG. 1 shows an inner side partial perspective view of one embodiment of an apparatus, in a variable camber position, for covering and uncovering a flap opening in an aircraft.

FIG. 1 shows an inner side partial perspective view of one embodiment of an apparatus 10, in a variable camber position 11, for covering and uncovering a flap opening 14 in an aircraft 12. The apparatus 10 may comprise an aircraft 12, a flap opening 14, a flap member 16, a torque tube member 18, at least one track member 20, a door member 22, a seal 24, a torque tube roller member 26, at least one roller member 28, and a biasing member 30. The aircraft 12 may comprise any type of air vehicle. In FIG. 1, the apparatus 10 and flap opening 14 are in a first mode in which the apparatus 10 covers the flap opening 14 and movement of the flap member 16 may not cause the door member 22 of the apparatus 10 to open to uncover the flap opening 14. The first mode may occur during transonic cruise of the aircraft 12.

Figure 2:
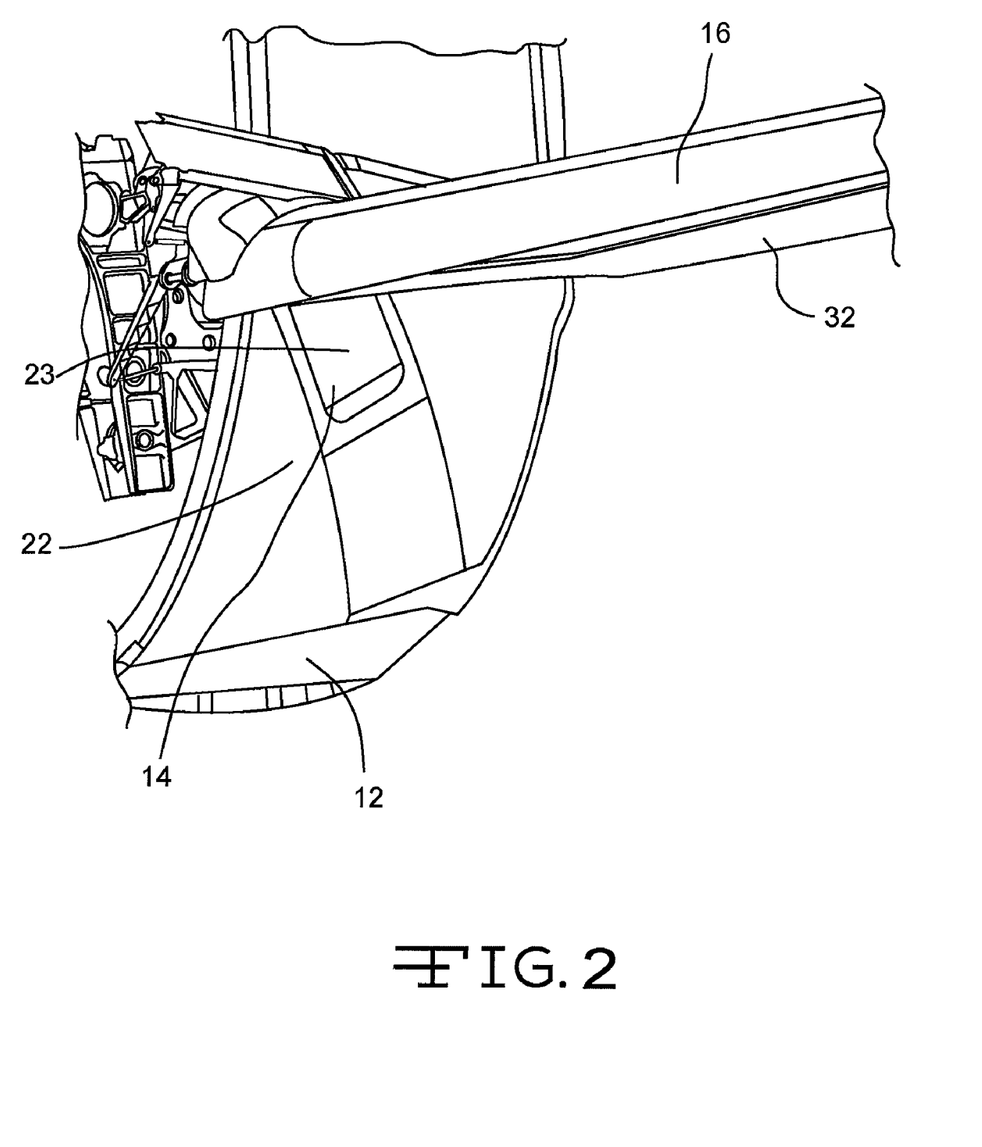
FIG. 2 shows an outer side partial perspective view of the embodiment of FIG. 1 with the flap member of the aircraft in a variable camber stowed position.
Figure 3:
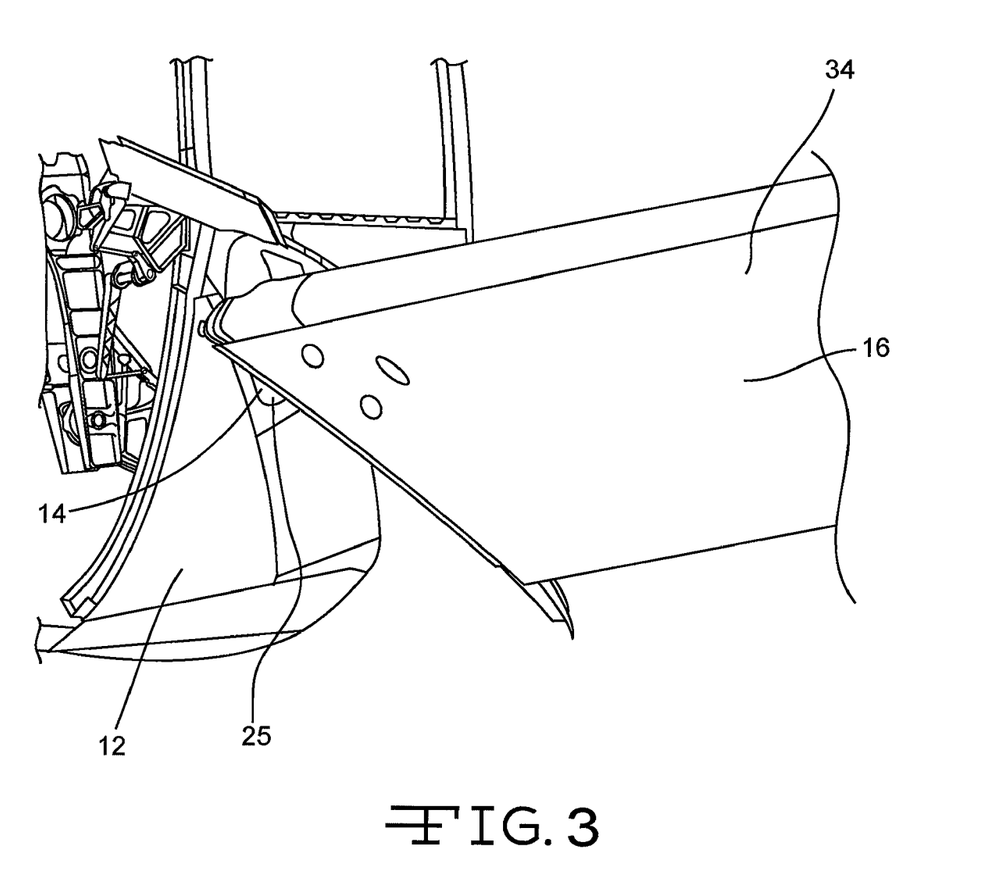
FIG. 3 shows an outer side partial perspective view of the embodiment of FIG. 1 with the flap member of the aircraft in a deployed position.
Figure 6:
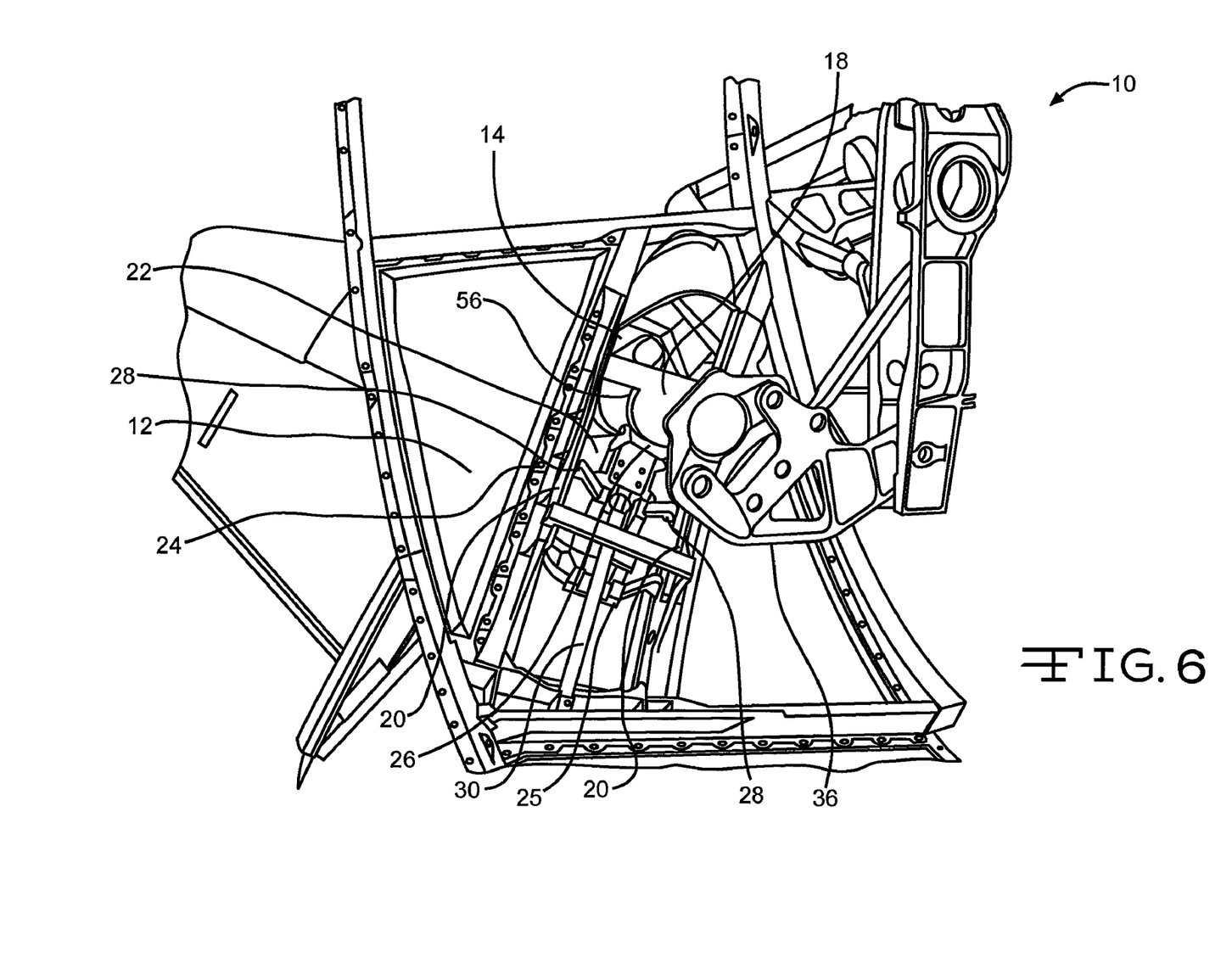
FIG. 6 shows an inner side partial perspective view of the embodiment of FIG. 1 with the torque tube member rotated all the way downward against the torque tube roller member to open the door member.

FIG. 2 shows an outer side partial perspective view of the embodiment of FIG. 1 in the first mode with the flap member 16 of the aircraft 12 in a variable camber stowed position 32. FIG. 3 shows an outer side partial perspective view of the embodiment of FIG. 1 with the flap member 16 of the aircraft 12 in a second mode in a deployed position 34. In the second mode, movement of the flap member 16 may cause the door member 22 to open to uncover the flap opening 14. The second mode may occur during take-off and landing of the aircraft 12. As shown in FIGS. 1-3, the flap member 16 may be attached to the torque tube member 18. The torque tube member 18 may be attached to an arm 36 driven by a motor (not shown). The motor may be adapted to drive the arm 36, the attached torque tube member 18, and the attached flap member 16, in order to move the flap member 16 from its variable camber stowed position 32 of FIG. 2 to its deployed position 34 of FIG. 3. As shown in FIG. 2, the door member 22 in its closed position 23 may be sized to cover the flap opening 14 in the aircraft 12 while the flap member 16 is in its variable camber stowed position 32. As shown in FIGS. 3 and 6, the door member 22 when moved to its open position 25 may at least partially uncover the flap opening 14 in the aircraft 12 while the flap member 16 is in its deployed position 34.

Figure 4:
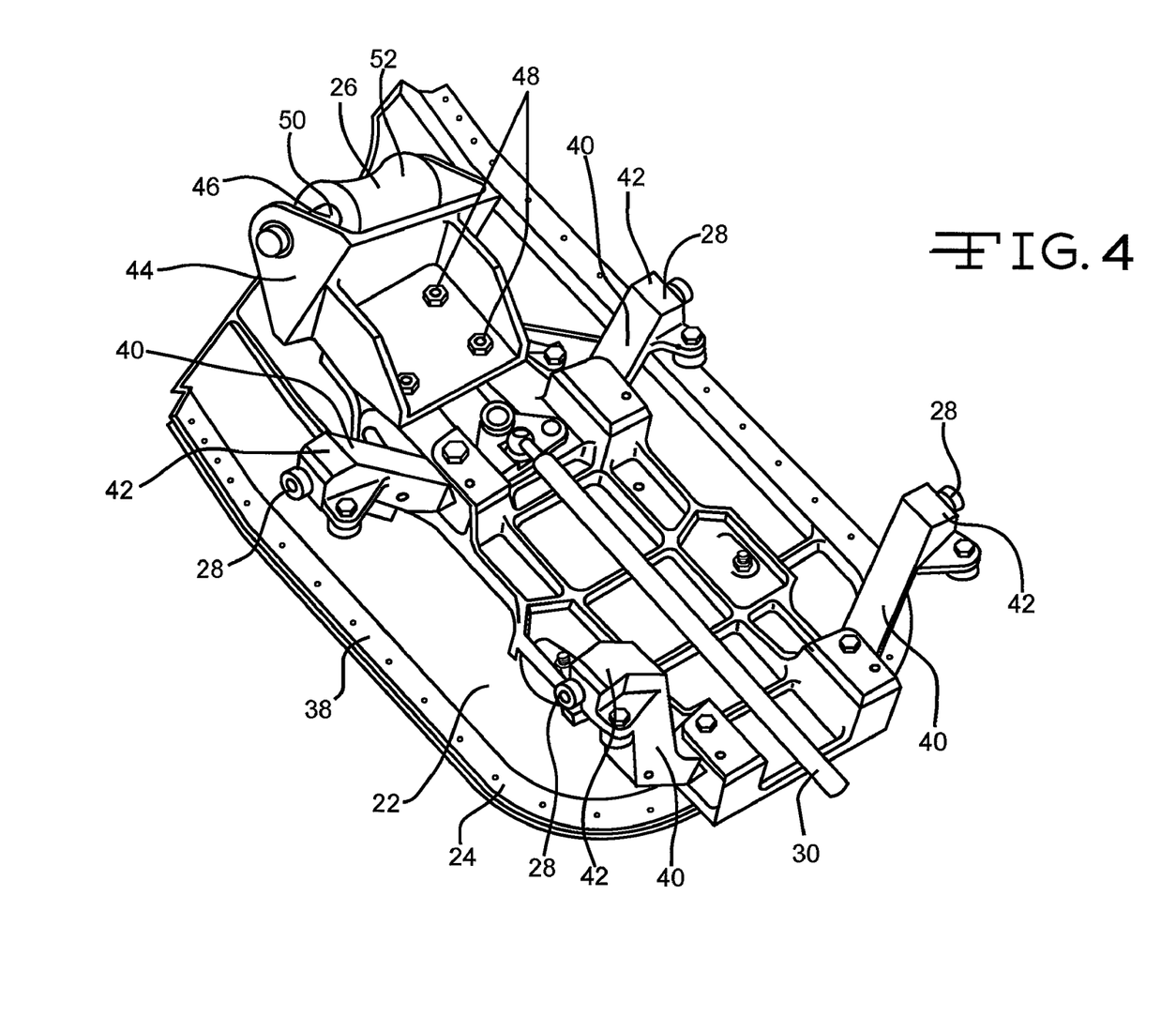
FIG. 4 shows a close-up inner side perspective view of the door member of the embodiment of FIG. 1 separated from the aircraft.

FIG. 4 shows a close-up inner side perspective view of the door member 22 of FIG. 1 separated from the aircraft 12. As shown, the seal 24 may cover a periphery 38 of the door member 22. The seal 24 may be adapted to seal the door member 22 against the flap opening 14 of the aircraft 12 when the door member 22 is in its closed position 23 of FIG. 2 covering the flap opening 14. The roller members 28 may be attached with the door member 22 via frame members 40. The frame members 40 may be bolted to the door member 22 or attached using other mechanisms. The roller members 28 may be attached to ends 42 of the frame members 40. As shown in FIG. 1, the roller members 28 may be attached to, and may follow, track members 20 of the aircraft 12. In such manner, the door member 22 may be adapted to move relative to the aircraft 12 when the roller members 28 move within the track members 20 of the aircraft 12.

As shown in FIG. 4, the torque tube roller member 26 may be attached with the door member 22 using a bracket 44 and a pin 46. The bracket 44 may be attached to the door member 22 using bolts 48 or though other mechanisms. The pin 46 may be threaded and may extend through opening 50 in the torque tube roller member 26 across the bracket 44. The opening 50 may be adapted to receive the threads in the torque tube roller member 26. In such manner, the torque tube roller member 26 may be adapted to rotate-ably move along the pin 46. In other embodiments, the torque tube roller member 26 may be attached to the door member 22 using other mechanisms.

The outer surface 52 of the torque tube roller member 26 may be contoured to interact with the shape of the torque tube member 18 of the aircraft 12. For instance, the outer surface 52 of the torque tube roller member 18 may be concave, curved, and/or in other shapes. The biasing member 30 may be attached to the door member 22 and may be adapted to be attached to the aircraft 12 to bias the door member 22 towards its closed position 23 covering the flap opening 14 of the aircraft 12. The biasing member 30 may comprise a spring, a gas spring, or other type of biasing member.

As shown in FIG. 1, when the flap member 16 of the aircraft 12 is in its variable camber stowed position 32, the torque tube roller member 26 may be spaced apart from and not in contact with the torque tube member 18. This may allow the torque tube member 18 and its associated flap member 16 to undergo small movements during normal cruise, while in the variable camber stowed position 32, without the torque tube member 18 contacting and moving the torque tube roller member 26. As a result, the door member 22 may remain in its closed position 23 over the flap opening 14. This may lessen drag on the aircraft 12, and increase durability of the apparatus 10 since the door member 22 may not constantly open and close during small movements of the flap member 16 and torque tube member 18 during normal cruise.

Figure 5:
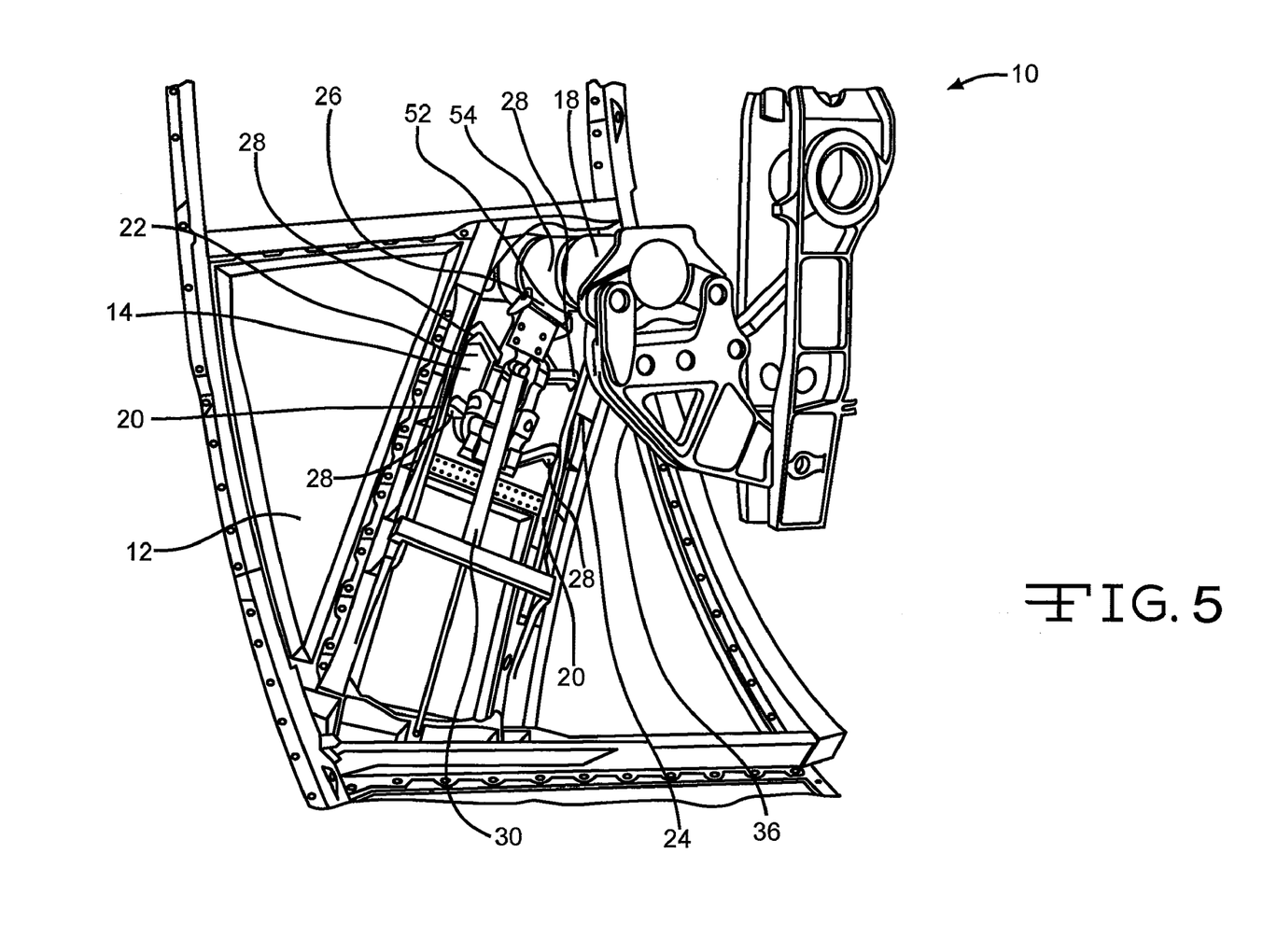
FIG. 5 shows an inner side partial perspective view of the embodiment of FIG. 1 with the torque tube member rotated partially downward to contact the torque tube roller member.
Figure 7:
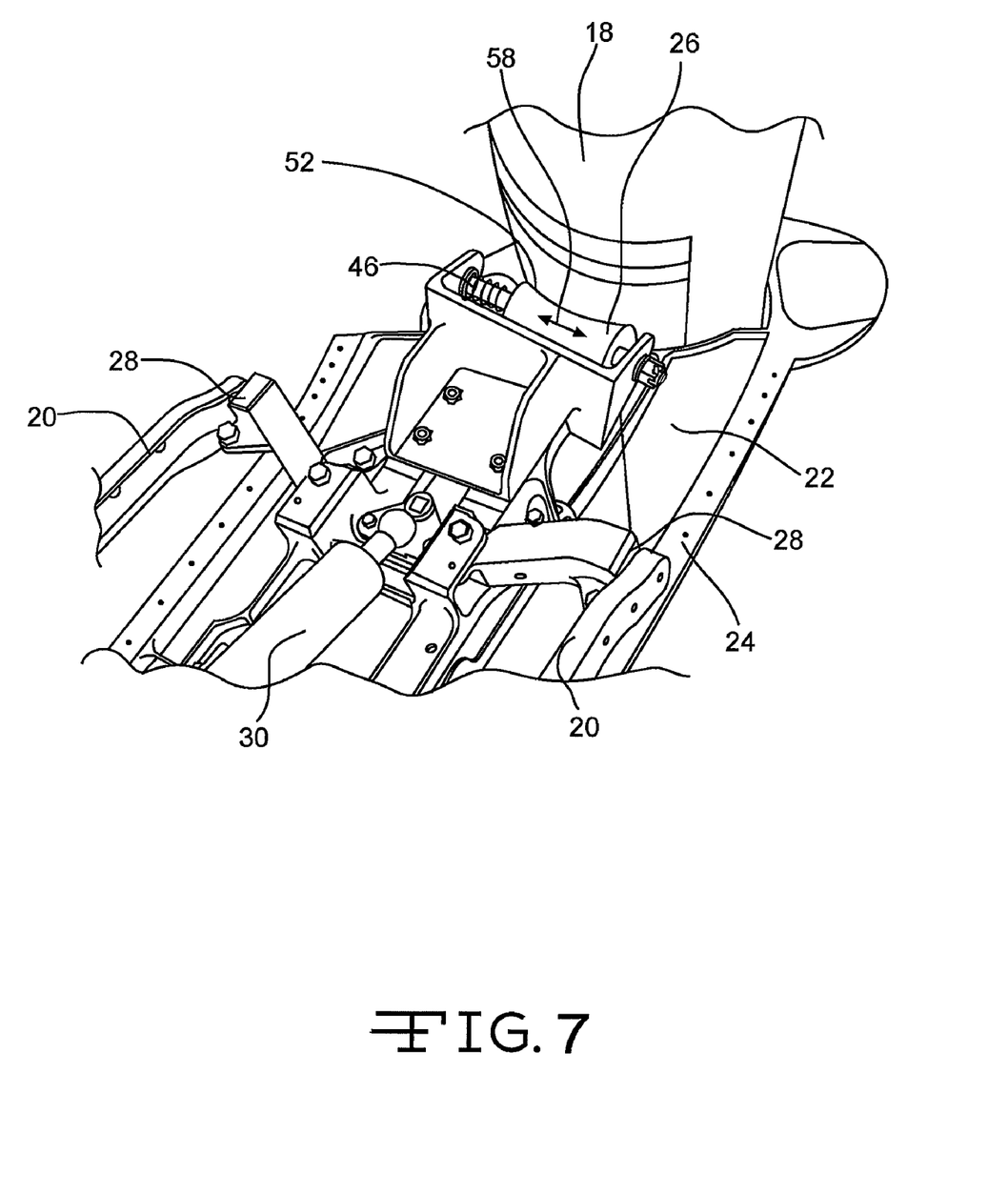
FIG. 7 shows a close-up inner side partial perspective view of the embodiment of FIG. 5 showing the torque tube member rotating the torque tube roller.

When the flap member 16 is to be deployed from its variable camber stowed position 32 of FIG. 2, the motor may initially drive the torque tube member 18, along with the attached flap member 16, rotate-ably downward to a second mode position 54 shown in FIG. 5. In the second mode position 54, the torque tube member 18 abuts against the contoured outer surface 52 of the torque tube roller member 26 and movement of the flap member 16 may cause the door member 22 to open to uncover the flap opening 14. The motor may continue driving the torque tube member 18, along with the attached flap member 16, rotate-ably downward to another second mode position 56 shown in FIG. 6. As the torque tube member 18 rotates downwardly from position 54 to position 56, as shown in FIG. 7, the torque tube member 18 may rotate downwardly against the contoured outer surface 52 of the torque tube roller member 26 causing it to rotate-ably move along the pin 46 along direction 58. In such manner, the torque tube roller member 26 may undergo relative motion with respect to both the pin 46 and the torque tube member 18.

The pushing of the outer surface 52 of the torque tube roller member 26 by the torque tube member 18 may result in the door member 22 being driven from its closed position 23 of FIG. 2 covering the flap opening 14 to its open position 25 of FIG. 3 uncovering the flap opening 14. When this occurs, the roller members 28 attached with the door member 22 may move within and follow the track members 20 of the aircraft 12. The flap member 16 may then reach its fully deployed position 34 of FIG. 3.

When the motor drives the torque tube member 18 back into its position of FIG. 1, the attached flap member 16 may return to its stowed position 32 of FIG. 2. During this time, the biasing member 30, which is attached to both the aircraft 12 and the door member 22, may force the door member 22 back to its closed position 23 of FIG. 2 covering the flap opening 14. The torque tube roller member 26 may return to its variable camber position of FIG. 1.

Figure 8:
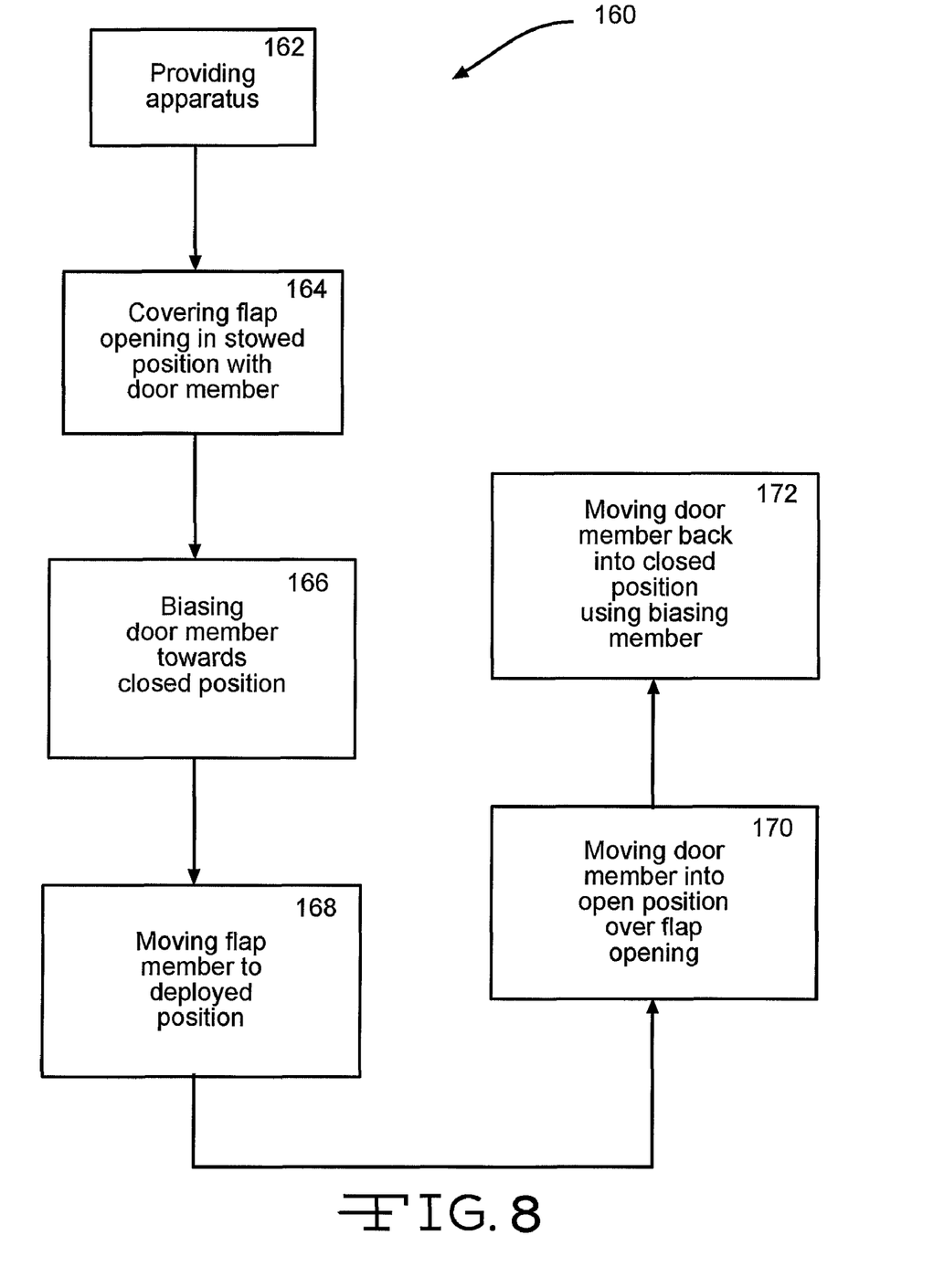
FIG. 8 is a flowchart showing one embodiment of a method of covering and uncovering a flap opening in an aircraft.

FIG. 8 is a flowchart of one embodiment of a method 160 of covering and uncovering a flap opening 14 in an aircraft 12. In step 162, an apparatus 10 may be provided. The apparatus 10 may comprise: a door member 22 attached with a torque tube roller member 26; at least one roller member 28 attached with the door member 22 and a track member 20 of the aircraft 12; and at least one biasing member 30 attached with the door member 22 and the aircraft 12.

In other embodiments, the apparatus 10 may comprise any of the embodiments disclosed herein. For instance, a seal 24 may cover a periphery 38 of the door member 22. The torque tube roller member 26 may be attached to a pin 46 attached with the door member 22. The torque tube roller member 26 may be contoured for the shape of the torque tube member 18. The biasing member 30 may be at least one of a spring, a gas spring, or other biasing member.

In step 164, the flap opening 14 in the aircraft 12 may be covered with the door member 22 in a closed position 23 when a flap member 16 of the aircraft 12 is in a stowed position 32. The torque tube roller member 26 may be adapted to not be in contact with the torque tube member 18 in a variable camber closed position. In step 166, the door member 22 may be biased, using the biasing member 30, towards remaining in the closed position 23. In step 168, the flap member 16 may be moved from the stowed position 32 into a deployed position 34.

In step 170, the door member 22 may be moved into an open position 25 in which the flap opening 14 is not completely covered by the door member 22. This may occur by pushing of the torque tube member 18, attached with the flap member 16, against the torque tube roller member 26 when the flap member 16 is moved from the stowed position 32 into the deployed position 34. During this time, the torque tube roller member 26 may move relative to the pin 46 and to the torque tube member 18. The roller member 28 may follow the track member 20, to move the door 22 from the closed position 23 to the open position 25, when the torque tube member 18 pushes against the torque tube roller member 26. In step 172, the door member 22 may be moved back into the closed position 23 using the biasing member 30 when the flap member 16 is moved from the deployed position 34 back into the stowed position 32.

One or more embodiments of the disclosure may reduce drag, may allow for variable camber action, may work passively without actuators, sensors, controls, or external power, may reduce noise, may be completely stowed within the aircraft, may be easy to install, may be reliable, and/or may allow for easy maintenance. In such manner, one or more problems of one or more of the existing apparatus and/or methods may be reduced and/or eliminated.

It should be understood, of course, that the foregoing relates to exemplary embodiments of the disclosure and that modifications may be made without departing from the spirit and scope of the disclosure as set forth in the following claims.

The invention claimed is:

1. An apparatus for covering and uncovering a flap opening in an aircraft comprising:
    a door member;
    a torque tube member attached to a flap of an aircraft;
    a flap opening;
    separate track members disposed along opposite sides of the flap opening;
    a torque tube roller member attached to the door member, wherein the torque tube roller member rotates relative to the door member around a rotation axis; and
    a plurality of roller members attached to the door member, wherein the roller members are disposed at opposed sides of the door member, and the roller members are attached to and are configured to relatively move along the separate track members to move the door member from a position covering the flap opening to a position uncovering the flap opening;
    wherein in one position the torque tube roller member is in contact with the torque tube member which is configured to rotate the torque tube roller member around the rotation axis relative to the door member, and to force the roller members to move along the separate track members thereby moving the door member from the position covering the flap opening to the position uncovering the flap opening.

2. The apparatus of claim 1 further comprising a seal covering a periphery of the door member.

3. The apparatus of claim 1 further comprising a pin which the torque tube roller member rotates around.

4. The apparatus of claim 3 wherein the pin is threaded and the torque tube roller member has an opening through the torque tube roller member with the opening receiving the threads of the pin.

5. The apparatus of claim 1 wherein an outer surface of the torque tube roller member is at least one of curved and concave in a direction along a longitudinal axis extending along the outer surface.

6. The apparatus of claim 1 wherein the door member is one-piece.

7. The apparatus of claim 1 further comprising a biasing member attached to the door member.

8. The apparatus of claim 7 wherein the biasing member is biasing the door member to cover the flap opening in the aircraft.

9. The apparatus of claim 8 wherein the biasing member is at least one of a spring and a gas spring.

10. The apparatus of claim 1 wherein the separate track members are disposed at a non-parallel angle to the rotation axis of the torque tube roller member so that the door member moves along an axis at the non-parallel angle to the rotation axis of the torque tube roller member as the door member moves from the position covering the flap opening to the position uncovering the flap opening.

11. The apparatus of claim 1 wherein in a first mode the flap opening is covered by the door member and movement of the flap of the aircraft does not cause the door member to open to uncover the flap opening, and in a second mode movement of the flap causes the door member to open to uncover the flap opening.

12. The apparatus of claim 11 wherein the first mode is during cruise of the aircraft in which the apparatus is in a variable camber position, and the second mode is during take-off and landing of the aircraft.

13. The apparatus of claim 12 wherein the torque tube roller member is not in contact with the torque tube member in the variable camber position.

14. The apparatus of claim 1 further comprising a pin which the torque tube roller member rotates around, wherein the torque tube roller member moves relative to both the pin and the torque tube member.

* * * * *